United States Patent
Lee et al.

(10) Patent No.: US 9,445,328 B2
(45) Date of Patent: Sep. 13, 2016

(54) METHOD FOR RESELECTING A CELL AT A USER EQUIPMENT IN WIRELESS COMMUNICATION SYSTEM

(75) Inventors: Youngdae Lee, Anyang-si (KR);
Sunghoon Jung, Anyang-si (KR);
Seungjune Yi, Anyang-si (KR);
Sungduck Chun, Anyang-si (KR);
Sungjun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 98 days.

(21) Appl. No.: 14/126,766

(22) PCT Filed: Jul. 5, 2012

(86) PCT No.: PCT/KR2012/005333
§ 371 (c)(1),
(2), (4) Date: Dec. 16, 2013

(87) PCT Pub. No.: WO2013/009034
PCT Pub. Date: Jan. 17, 2013

(65) Prior Publication Data
US 2014/0113633 A1    Apr. 24, 2014

Related U.S. Application Data

(60) Provisional application No. 61/507,594, filed on Jul. 13, 2011, provisional application No. 61/507,609, filed on Jul. 14, 2011.

(51) Int. Cl.
*H04W 36/00* (2009.01)
*H04W 36/08* (2009.01)
(Continued)

(52) U.S. Cl.
CPC ......... *H04W 36/08* (2013.01); *H04W 36/0061* (2013.01); *H04W 4/06* (2013.01); *H04W 48/20* (2013.01)

(58) Field of Classification Search
USPC ......................................... 455/436, 525, 443
See application file for complete search history.

(56) References Cited

U.S. PATENT DOCUMENTS

| 8,155,681 B2 * | 4/2012 | Iwamura et al. ............. 455/509 |
| 2006/0072516 A1 * | 4/2006 | Jeong ................. H04W 72/005 370/335 |
| 2010/0304747 A1 | 12/2010 | Kazmi et al. |

(Continued)

FOREIGN PATENT DOCUMENTS

| JP | 2009-268105 A | 11/2009 |
| KR | 10-2006-0024756 A | 3/2006 |

(Continued)

OTHER PUBLICATIONS

International Search Report from PCT/KR2012/005333, dated Jan. 24, 2013.

(Continued)

*Primary Examiner* — Patrick Edouard
*Assistant Examiner* — Said Elnoubi
(74) *Attorney, Agent, or Firm* — Dentons US LLP

(57) ABSTRACT

The present invention relates to a method for enabling a terminal to reselect a cell in a wireless communication system. In more detail, the method includes receiving probability information relating to cell reselection from a network, and performing first cell reselection by using the received probability information when a specific service is received or is to be received.

5 Claims, 8 Drawing Sheets

(51) Int. Cl.
*H04W 48/20* (2009.01)
*H04W 4/06* (2009.01)

(56) References Cited

U.S. PATENT DOCUMENTS

2012/0252432 A1* 10/2012 Henttonen ............ H04W 24/10
455/422.1
2013/0095838 A1* 4/2013 Uemura ................ H04W 36/30
455/443

FOREIGN PATENT DOCUMENTS

KR 10-2009-0029628 A 3/2009
KR 10-2009-0045242 A 5/2009

OTHER PUBLICATIONS

Written Opinion of the ISA from PCT/KR2012/005333, dated Jan. 23, 2013.

* cited by examiner (a) Control-plane protocol stack (b) User-plane protocol stack

METHOD FOR RESELECTING A CELL AT A USER EQUIPMENT IN WIRELESS COMMUNICATION SYSTEM

This application is a 35 USC §371 National Stage entry of International Application No. PCT/KR2012/005333, filed on Jul. 5, 2012, which claims priority to U.S. Provisional Application No. 61/507,594, filed on Jul. 13, 2011, and U.S. Provisional Application No. 61/507,609, filed on Jul. 14, 2011, each of which are hereby incorporated by reference in its entirety.

TECHNICAL FIELD

The present invention relates to a wireless communication system, and more particularly, to a method for enabling a user equipment to transmit and receive a signal in a wireless communication system and a device for the same.

BACKGROUND ART

A $3^{rd}$ generation partnership project long term evolution (3GPP LTE) (hereinafter, referred to as 'LTE') communication system which is an example of a mobile communication system to which the present invention can be applied will be described in brief.

FIG. 1 is a diagram illustrating a network structure of an Evolved Universal Mobile Telecommunications System (E-UMTS) which is an example of a mobile communication system. The E-UMTS is an evolved version of the conventional UMTS, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (eNode B and eNB), and an Access Gateway (AG) which is located at an end of a network (E-UTRAN) and connected to an external network. The base stations may simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic can be used between the base stations. An interface for transmitting user traffic or control traffic may be used between the base stations. A Core Network (CN) may include the AG and a network node or the like for user registration of the user equipment UE. The AG manages mobility of the user equipment UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure, open type interface, proper power consumption of the user equipment, etc. are required.

DISCLOSURE

Technical Problem

Based on the aforementioned discussion, an object of the present invention devised to solve the conventional problem is to provide a method for enabling a user equipment to transmit and receive a signal in a wireless communication system and a device for the same.

Technical Solution

In one aspect of the present invention, a method for enabling a user equipment to reselect a cell in a wireless communication system comprises the steps of receiving probability information related to cell reselection from a network; and performing first cell reselection by using the received probability information when a specific service is received or is desired to be received.

Preferably, the method may further comprise the step of receiving first cell reselection priority information and second cell reselection priority information from the network.

In this case, the method may further comprise the step of performing second cell reselection in accordance with the first cell reselection priority information, wherein the first cell reselection is performed in accordance with the second cell reselection priority information. Moreover, application of the second cell reselection priority information may be determined during the first cell reselection by comparison between the received probability information and a random number extracted by the user equipment. In other words, if the random number is lower than a number indicated by the probability information, the second cell reselection priority information may be applied during the first cell reselection.

More preferably, if a cell of a frequency, to which the specific service is provided, the method may further comprise the step of receiving the specific service from the reselected cell.

In this case, the method may further comprise the steps of enabling the user equipment to extract a random number if the user equipment does not receive the specific service or does not desire to receive the specific service, or if the user equipment should perform connection configuration with the network; and determining application of the first cell reselection priority when third cell reselection is performed by comparing the received probability information with the random number extracted by the user equipment.

Advantageous Effects

According to the embodiment of the present invention, the network may provide effective multimedia broadcast multicast service (MBMS).

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Although the embodiment of the present invention will be described based on the LTE system and the LTE-A system in this specification, the LTE system and the LTE-A system are only exemplary, and the embodiment of the present invention may be applied to all communication systems corresponding to the aforementioned definition. Also, although the embodiment of the present invention will be described based on an FDD mode in this specification, the FDD mode is only exemplary, and the embodiment of the present invention may easily be applied to an H-FDD mode or a TDD mode.

Figure 1:
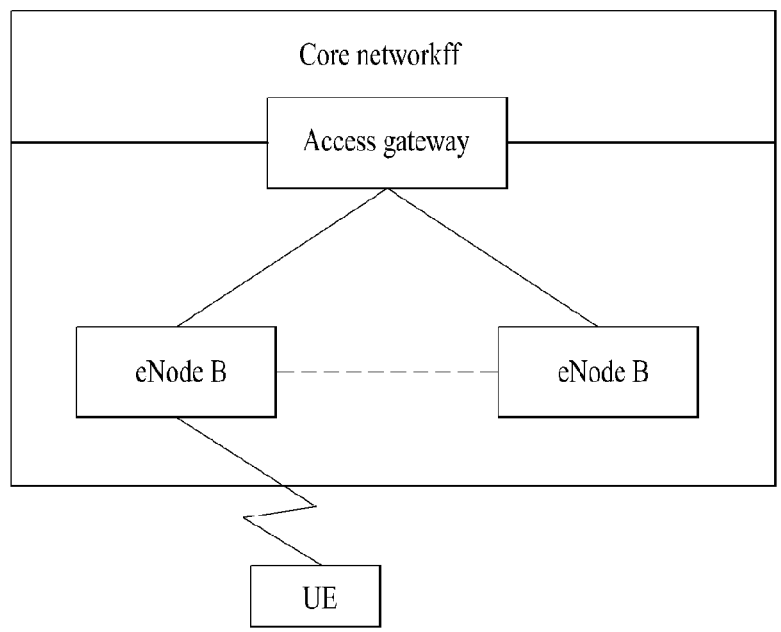
FIG. 1 is a diagram illustrating a network structure of an Evolved Universal Mobile Telecommunications System (E-UMTS), which is an example of a wireless communication system.
Figure 2:
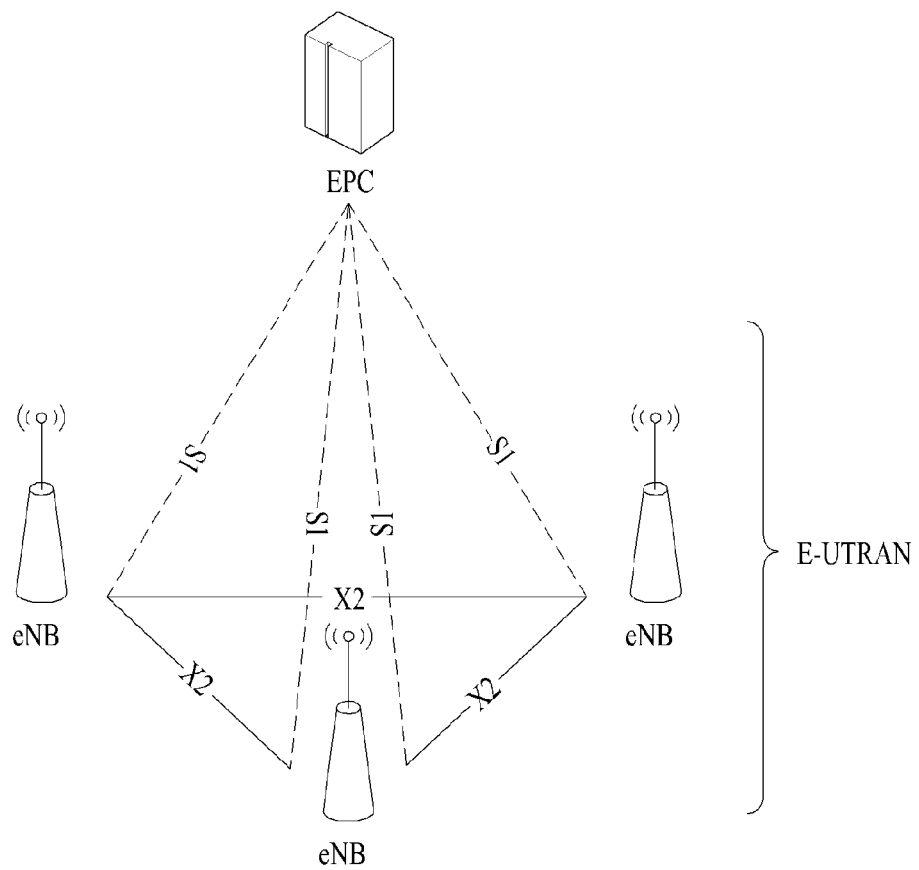
FIG. 2 is a diagram illustrating a network structure of an evolved universal terrestrial radio access network (E-UTRAN)

FIG. 2 is a diagram illustrating a network structure of an Evolved Universal Terrestrial Radio Access Network (E-UTRAN) which is an example of a mobile communication system. In particular, the E-UTRAN system is an evolved version of the conventional UTRAN system. The E-UTRAN includes cells (eNBs), which are connected with each other through an interface X2. Also, each of the cells is connected with a user equipment (UE) through a radio interface and connected with an evolved packet core (EPC) through an interface S1.

The EPC includes a mobility management entity (MME), a serving-gateway (S-GW), and a packet data network-gateway (PDN-GW). The MME includes access information of the user equipment or ability information of the user equipment. The access information or the ability information is mainly used for mobility management of the user equipment. The S-GW is a gateway having the E-UTRAN as an end point, and the PDN-GW is a gateway having a packet data network (PDN) as an end point.

Figure 3:
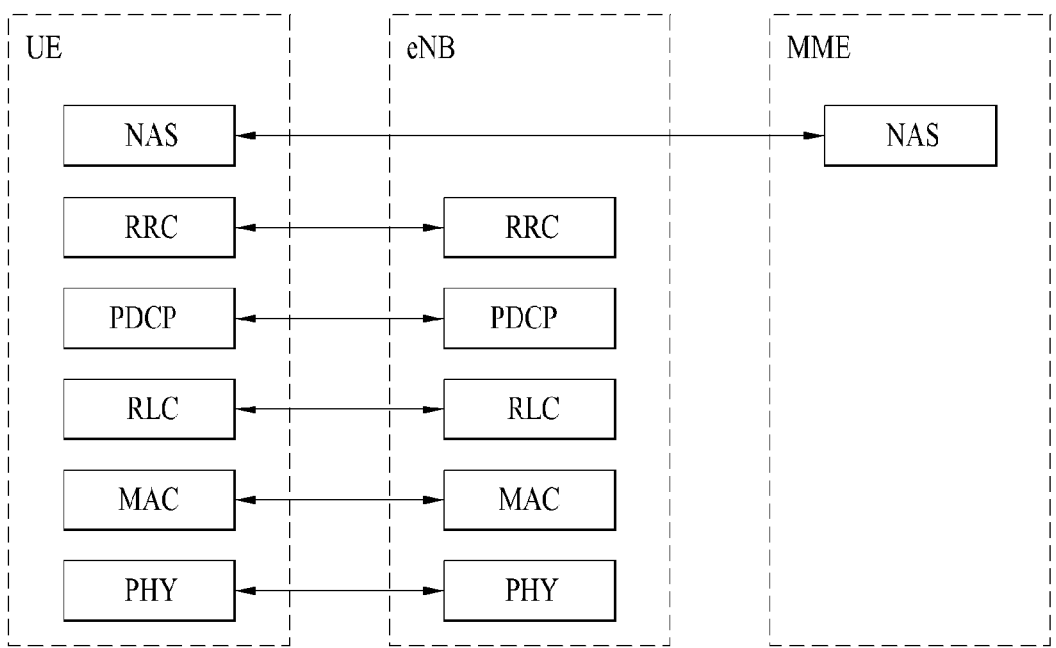
FIG. 3 is a diagram illustrating structures of a control plane and a user plane of a radio interface protocol between a user equipment and an E-UTRAN based on the 3GPP radio access network standard.
Figure 3:
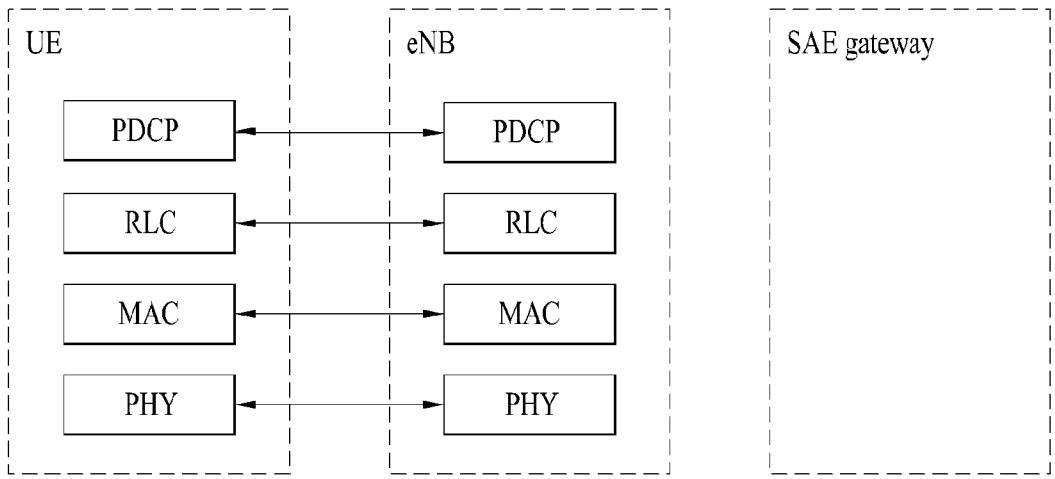

FIG. 3 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other.

One cell constituting a base station eNB is set to one of bandwidths of 1.25, 2.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH).

Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 4:
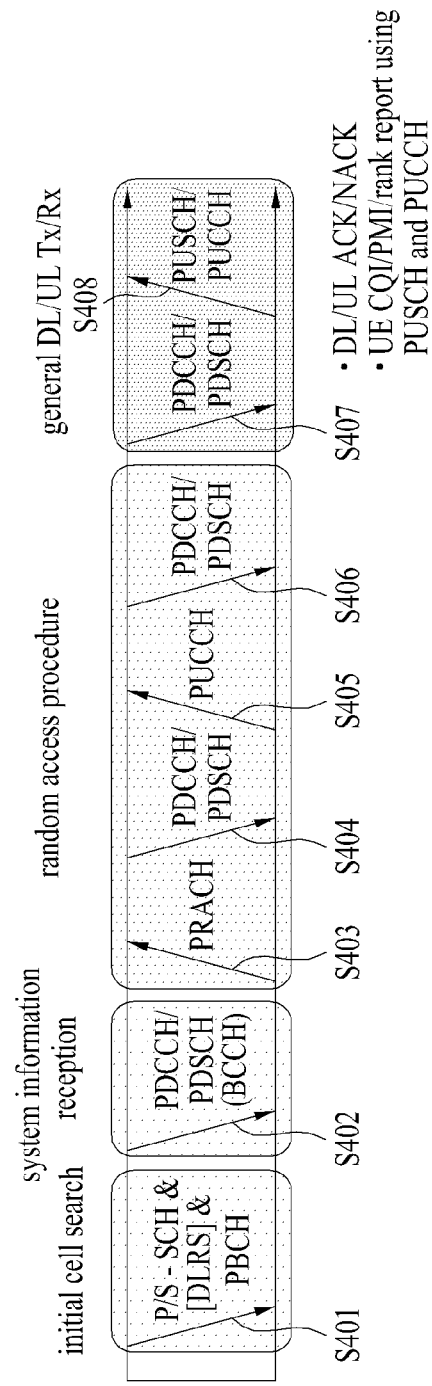
FIG. 4 is a diagram illustrating physical channels used in a 3GPP system and a general method for transmitting a signal using the physical channels.

FIG. 4 is a diagram illustrating physical channels used in a 3GPP system and a general method for transmitting a signal using the physical channels.

The user equipment performs initial cell search such as synchronizing with the base station when it newly enters a cell or the power is turned on (S401). To this end, the user equipment may synchronize with the base station by receiving a primary synchronization channel (P-SCH) and a secondary synchronization channel (S-SCH) from the base station, and may acquire information of cell ID, etc. Afterwards, the user equipment may acquire broadcast information within the cell by receiving a physical broadcast channel (PBCH) from the base station. In the mean time, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH (S402).

In the meantime, if the user equipment initially accesses the base station, or if there is no radio resource for signal transmission, the user equipment may perform a random access procedure (RACH) for the base station (S403 to S406). To this end, the user equipment may transmit a preamble of a specific sequence through a physical random access channel (PRACH) (403), and may receive a response message to the preamble through the PDCCH and the PDSCH corresponding to the PDCCH (S404). In case of a contention based RACH, a contention resolution procedure may be performed additionally.

The user equipment which has performed the aforementioned steps may receive the PDCCH/PDSCH (S407) and transmit a physical uplink shared channel (PUSCH) and a physical uplink control channel (PUCCH) (S408), as a general procedure of transmitting uplink/downlink signals. In particular, the user equipment receives downlink control information (DCI) through the PDCCH. In this case, the DCI includes control information such as resource allocation information on the user equipment, and has different formats depending on its usage.

In the meantime, the control information transmitted from the user equipment to the base station or received from the base station to the user equipment through the uplink includes downlink/uplink ACK/NACK signals, a channel quality indicator (CQI), a precoding matrix index (PMI), a scheduling request (SR), and a rank indicator (RI). In case of the 3GPP LTE system, the user equipment may transmit the aforementioned control information such as CQI/PMI/RI through the PUSCH and/or the PUCCH.

Figure 5:
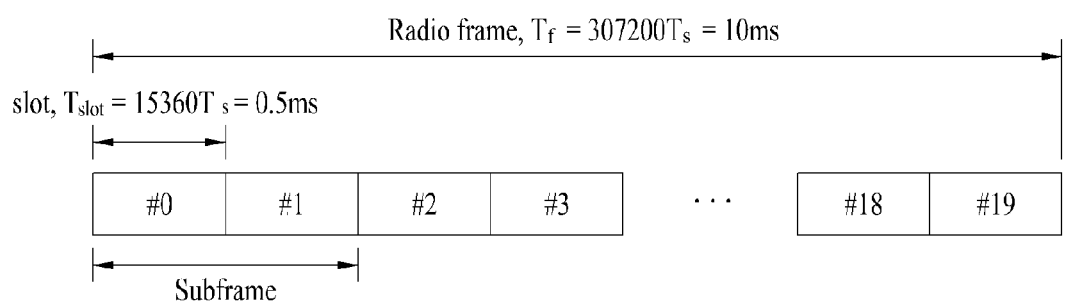
FIG. 5 is a diagram illustrating a structure of a radio frame used in an LTE system.

FIG. 5 is a diagram illustrating a structure of a radio frame used in an LTE system.

Referring to FIG. 5, a radio frame has a length of 10 ms ($327200 \times T_s$) and includes ten (10) subframes of an equal size. Each sub frame has a length of 1 ms and includes two slots. Each slot has a length of 0.5 ms ($15360T_s$). In this case, $T_s$ represents a sampling time, and is expressed by $T_s=1/(15 \text{ kHz} \times 2048)=3.2552 \times 10^{-8}$ (about 33 ns). The slot includes a plurality of orthogonal frequency division multiplexing (OFDM) symbols or single carrier-frequency division multiple access (SC-FDMA) symbols in a time domain, and includes a plurality of resource blocks (RBs) in a frequency domain. In the LTE system, one resource block includes twelve (12) subcarriers×seven (or six) OFDM symbols or SC-FDMA symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols or SC-FDMA symbols included in the slot.

Hereinafter, RRC state mode of the user equipment and RRC connection method will be described.

The RRC state mode means whether the RRC layer of the user equipment is logically connected with the RRC layer of the E-UTRAN. If the RRC layer of the user equipment is logically connected with the RRC layer of the E-UTRAN, it may be referred to as RRC connected (RRC_CONNECTED) mode. If not so, it may be referred to as RRC idle (RRC_IDLE) mode.

Since the E-UTRAN may identify the presence of the user equipment which is in the RRC_CONNECTED mode, on the basis of cell unit, it may effectively control the user equipment. On the other hand, the E-UTRAN may not identify the user equipment which is in the RRC_IDLE mode, on the basis of cell unit. In this case, the user equipment is managed by the core network (CN) on the basis of tracking area (TA) unit which is a local unit greater than the cell unit. In other words, in order that the user equipment which is in the RRC_IDLE mode receives a normal mobile communication service such as voice or data, the user equipment should be shifted to the RRC_CONNECTED mode.

In particular, when the user initially turns on the power of the user equipment, the user equipment searches for a proper cell and then is maintained in the RRC_IDLE mode in the corresponding cell. The user equipment maintained in the RRC idle mode performs RRC connection establishment procedure with the RRC layer of the E-UTRAN only if the RRC connection is required, and then is shifted to the RRC_CONNECTED mode. In this case, the case where the RRC connection is required may include a case where uplink data transmission is required due to calling attempt of the user or a case where a response message to a paging message received from the E-UTRAN should be transmitted.

Figure 6:
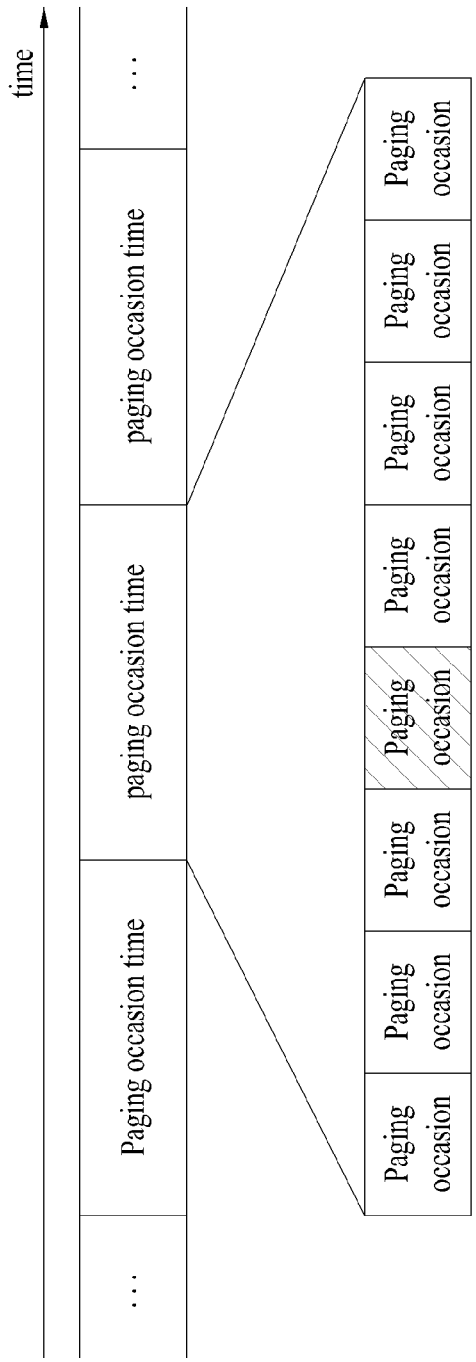
FIG. 6 is a diagram illustrating a general method for transmission and reception based on a paging message.

FIG. 6 is a diagram illustrating a general method for transmission and reception based on a paging message.

Referring to FIG. 6, the paging message includes a paging cause and a paging record of UE identity. When receiving the paging message, the user equipment may perform discontinuous reception (DRX) to reduce power consumption.

In more detail, a network includes several paging occasions (POs) per time period called paging DRX cycle, and a specific user equipment may acquire a paging message by receiving a specific paging occasion only. The specific user equipment does not receive a paging channel at the time except for the specific paging occasion time, and may be in a sleep mode to reduce power consumption. One paging occasion time corresponds to one TTI.

The base station and the user equipment use a paging indicator (PI) as a specific value for indicating transmission of the paging message. The base station may notify the user equipment of transmission of paging information by defining a specific identifier (for example, paging—radio network temporary identity; P-RNTI) as a usage of PI. For example, the user equipment wakes up per DRX cycle and receives one subframe to identify the presence of the paging message. If the P-RNTI exists in L1/L2 control channel (PDCCH) of the received subframe, the user equipment may identify that the paging message exists in the PDSCH of the corresponding subframe. Also, if the UE identity (for example, IMSI) exists in the paging message, the user equipment receives a service by responding to the base station (for example, RRC connection or system information reception).

Next, system information will be described. The system information includes essential information that should be known by the user equipment to access the base station. Accordingly, the user equipment should receive all kinds of the system information before accessing the base station, and should have the latest system information. Since the system information is the information that should be known by all the user equipments within one cell, the base station transmits the system information periodically.

The system information may be divided into a master information block (MIB), a scheduling block (SB), and a system information block (SIB). The MIB allows the user equipment to know physical configuration of the corresponding cell, for example, bandwidth information. The SB indicates transport information of the SIBs, for example, transmission period. The SIB is the aggregation of related system information. For example, specific SIB includes only information of peripheral cells, and another SIB includes only information of an uplink radio channel used by the user equipment.

Hereinafter, a cell selection procedure and a cell reselection procedure will be described.

If the power of the user equipment is turned on, the user equipment should perform ready procedures for services by selecting a cell of proper quality. The user equipment which is in the RRC idle mode should always select a cell of proper quality and should be ready to receive services through this cell. For example, the user equipment which is just turned on should select a cell of proper quality to be registered with the network. If the user equipment which is in the RRC connected mode enters the RRC idle mode, this user equipment should select a cell which will stay in the RRC idle mode. In this way, to stay in a service standby mode such as the RRC idle mode, the procedure of allowing the user equipment to select a cell, which satisfies a specific condition, will be referred to as cell selection. Since the cell selection procedure is performed in a state that the user equipment fails to currently determine the cell which stays in the RRC idle mode, it is important to select the cell quickly if possible. Accordingly, if the cell provides radio signal quality more than a certain reference, this cell may be selected during the cell selection procedure of the user equipment even though the cell does not provide the best radio signal quality to the user equipment.

If the user equipment selects the cell, which satisfies the reference for cell selection, it receives information required for the operation of the corresponding cell in the RRC idle mode of the user equipment from the system information of the corresponding cell. After receiving all kinds of information required for the operation at the RRC idle mode, the user equipment is on standby in the RRC idle mode to request the network of services or receive services from the network.

After the user equipment selects a cell through the cell selection procedure, signal strength or signal quality between the user equipment and the base station may be changed due to mobility of the user equipment or change of a radio environment. If quality of the selected cell is deteriorated, the user equipment may select another cell that provides better quality. If the user equipment reselects a cell, it selects a cell that provides signal quality better than that of the currently selected cell. This will be referred to as a cell reselection procedure. The cell reselection procedure is basically intended to select a cell that provides the best quality to the user equipment, in view of quality of a radio signal. In addition to quality of the radio signal, the network may determine priority per frequency and notify the user equipment of the determined priority. The user equipment that has received the priority first considers the priority prior to quality basis of the radio signal during the cell reselection procedure.

Hereinafter, a multimedia broadcast multicast service (MBMS) will be described. The MBMS is a kind of a broadcast/multicast service, and is the service that transmits a multimedia data packet to a plurality of user equipments at the same time. The 'broadcast/multicast service', that is, 'MBMS' may be replaced with other terminologies such as 'point to multipoint service' and 'multicast and broadcast service (MBS)'. The MBMS is based on IP multicast, and the user equipments receive same multimedia data by sharing resources required for data packet transmission. Accordingly, if the user equipments of a certain level, which use the MBMS, exist in the same cell, resource efficiency may be increased. Since the MBMS has no relation with the RRC connected mode, the user equipment which is in the idle mode may receive the MBMS.

Figure 7:
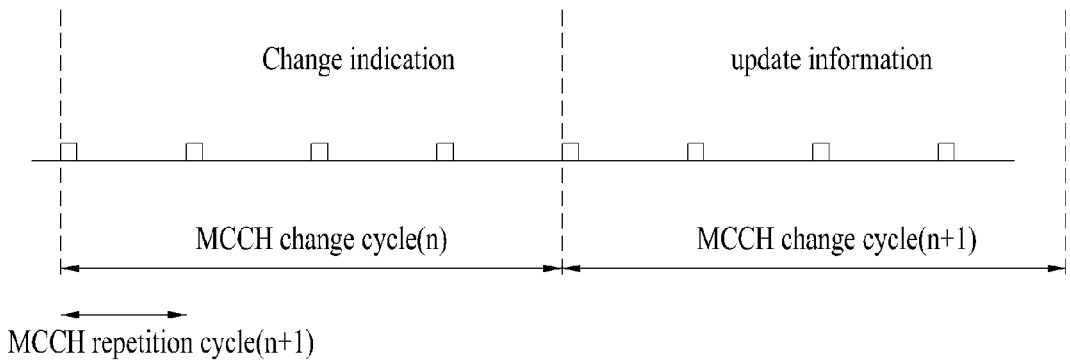
FIG. 7 is a diagram illustrating a transmission scheme of an MBMS control channel (MCCH)

A logic channel for MBMS (MBMS control channel (MCCH)) or MBMS traffic channel (MTCH) may be mapped into a transport channel MCH (MBMS channel). The MCCH transmits RRC message, which includes MBMS related common control information, and the MTCH transmits traffic of a specific MBMS. One MCCH exists per one MBMS single frequency network (MBSFN) area where the same MBMS information or traffic is transmitted, and if a plurality of MBSFN areas are provided to one cell, the user equipment may receive a plurality of MCCHs. FIG. 7 illustrates a transmission scheme of MCCH information.

Referring to FIG. 7, if MBMS related RRC message is changed in a specific MCCH, the PDCCH transmits MBMS-radio network temporary identity (M-RNTI) and an MCCH indicator indicating a specific MCCH. The user equipment that supports MBMS may identify that the MBMS related RRC message has been changed in the specific MCCH, by receiving the M-RNTI and the MCCH indicator through the PDCCH, and may receive the specific MCCH. RRC message of the MCCH may be changed per change period, and is broadcasted repeatedly per repetition period. FIG. 7 illustrates a transmission scheme of the MCCH information.

In the meantime, the MCCH transmits MBMS session currently in service and an MBSFNareaConfiguration message indicating RB configuration corresponding to the MBMS session. Also, the MCCH may receive one or more MBMS or transmit MBMS counting request MBMSCountingRequest message for counting the number of user equipments of RRC connected mode.

Also, specific MBMS control information may be provided through the BCCH. In particular, the specific MBMS control information may be included in SystemInformationBlockType13 broadcasted through the BCCH.

First Embodiment

The user equipment of idle mode camps on one cell by performing cell selection and cell reselection procedures and monitors a paging signal and system information on the camp-on cell. At this time, if the user equipment is interested in MBMS, the user equipment may receive the MBMS even in case that the user equipment is in the idle mode.

In the meantime, the user equipment of the idle mode may perform cell selection and cell reselection procedures in accordance with signal quality of the cell regardless of reception of the MBMS, and may select a cell that does not provide MBMS. In this case, the user equipment fails to receive the MBMS.

Accordingly, the present invention is characterized in that the user equipment designates a first frequency priority for cell selection, receives probability information from the network, and decides whether to apply another frequency priority, for example, a second frequency priority, in accordance with the received probability information, thereby receiving a desired specific service (for example, MBMS). If the user equipment decides to use the second frequency priority in accordance with the probability information, the user equipment performs cell reselection by changing the frequency priority for cell reselection from the first frequency priority to the second frequency priority.

In other words, if the user equipment desires to receive a specific service or is interested in a specific service, the user equipment reselects a cell by changing the priority of the frequency through which the specific service is provided in accordance with the probability information.

Preferably, if the user equipment may receive the specific service (MBMS) from the second frequency without cell reselection in the current camp-on cell, the user equipment does not perform the procedure of changing the frequency priority in accordance with the present invention. On the other hand, if the user equipment may receive the specific service (MBMS) from the second frequency through cell reselection only, the user equipment may perform the procedure of changing the frequency priority in accordance with the present invention.

In the meantime, the user equipment does not need to receive the information on the second frequency priority from the network. If the user equipment receives frequency information, which provides a specific service, the user equipment may configure the second frequency priority by correcting the frequency information.

It is noted that it is difficult to assure that cell reselection is performed in accordance with the cell reselection procedure even though the frequency priority is changed to the second frequency priority in accordance with the first embodiment of the present invention. Cell reselection may be performed only if the previously set condition is satisfied in accordance with a general procedure of the aforementioned cell reselection procedure.

According to the first embodiment of the present invention, it is possible to prevent a plurality of user equipments from being converged on a specific frequency to receive a specific service. As a result, a plurality of user equipments may be distributed in the frequency band uniformly to receive a specific service.

Hereinafter, the cell reselection procedure will be described in more detail with reference to the accompanying drawing.

Figure 8:
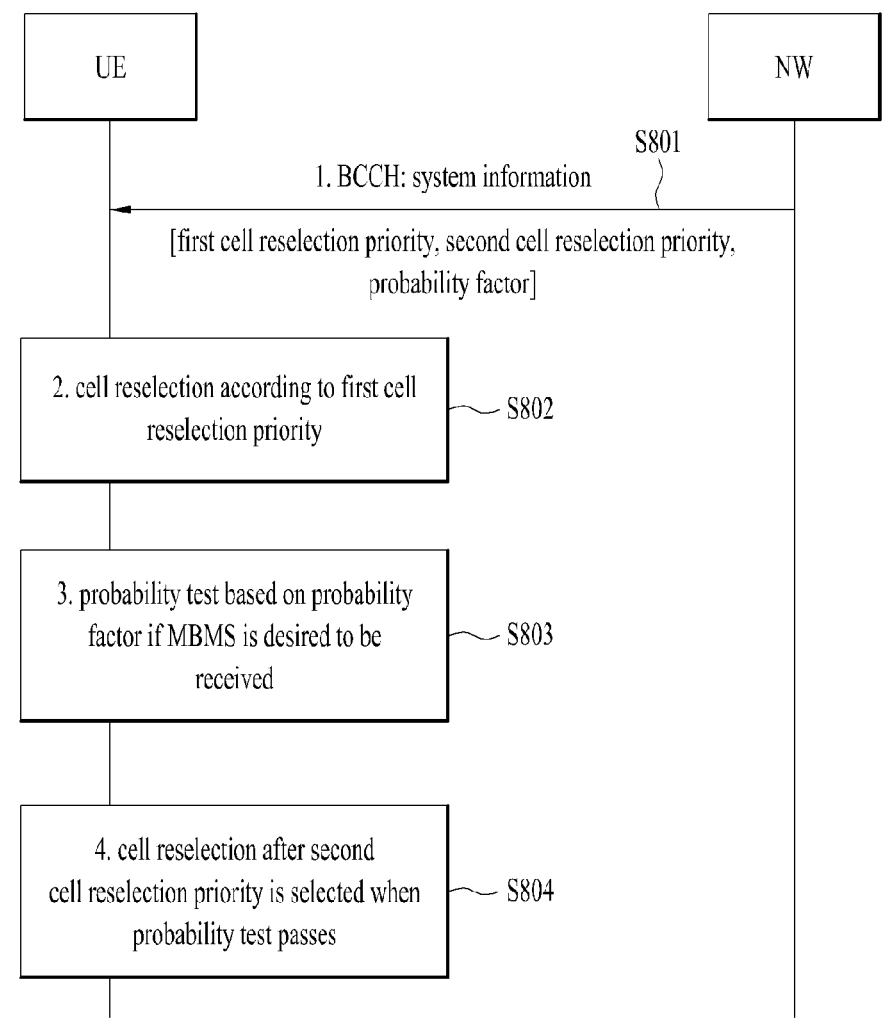
FIG. 8 is a flow chart illustrating a cell reselection procedure for a cell that provides MBMS according to the first embodiment of the present invention.

FIG. 8 is a flow chart illustrating a cell reselection procedure for a cell that provides MBMS according to the first embodiment of the present invention.

Referring to FIG. 8, the user equipment UE receives first cell reselection priority information from the network at step 801. In this case, the first cell reselection priority information may be received through system information on the BCCH or user equipment dedicated RRC signaling on the DCCH.

Moreover, in the first embodiment of the present invention, it is preferable that the user equipment receives probability information related to the frequency priority, which provides MBMS, together with the first cell reselection priority information at the step 801.

Additionally, although the user equipment UE may receive second cell reselection priority information desired to be changed at the step 801, the user equipment may configure the second cell reselection priority information by correcting the first cell reselection priority information as described above.

Subsequently, the user equipment UE performs the cell reselection procedure on the basis of the first cell reselection priority information at step 802. As a result, the user equipment may camp on the first cell on the first frequency.

Afterwards, if the user equipment UE desires to receive MBMS provided on the second frequency or is interested in the MBMS provided on the second frequency, the user equipment performs a probability test on the basis of the probability information at step 803.

In more detail, the user equipment may operate a random function and determine whether the operation result of the random function is more than a threshold value indicated by the probability information. If the result of the random function is less than the threshold value, the user equipment may be regarded that it has passed the probability test. In other words, if the result of the random function is more than the threshold value, the user equipment may be regarded that it has failed to pass the probability test.

If the user equipment may receive a specific service (MBMS) from the second frequency without the cell reselection procedure in the current camp-on first cell, the user equipment does not perform the procedure of changing frequency priority according to the present invention. On the other hand, if the user equipment may receive the specific service (MBMS) from the second frequency through cell reselection only, the user equipment may perform the procedure of changing frequency priority according to the present invention.

Consequently, the user equipment that has passed the probability test performs the cell reselection procedure on the basis of the second cell reselection priority information at step 804. In other words, the user equipment performs the cell reselection procedure on the basis of the second reselection priority information indicating that the second frequency, which provides the MBMS, is set as high priority. The user equipment that has failed to pass the probability test performs the cell reselection procedure on the basis of the first cell reselection priority information at step 804.

In the meantime, if the user equipment does not desire to receive the MBMS, is not interested in the MBMS, or desires to perform RRC connection establishment, the user equipment may perform the probability test on the basis of the probability information.

Accordingly, the user equipment that has passed the probability test performs the cell reselection procedure on the basis of the first cell reselection priority information, or third cell reselection priority information separately received from the network. The user equipment that has failed to pass the probability test performs the cell reselection procedure on the basis of the second cell reselection priority information.

Second Embodiment

In the second embodiment of the present invention, a method for enabling a user equipment to receive MBMS when carrier aggregation (CA) is applied to the present invention will be described.

First of all, a carrier aggregation scheme (hereinafter, referred to as CA) of the LTE-A system will be described.

The LTE-A technology standard is the IMT-Advanced candidate technology of the International Telecommunication Union (ITU) and is designed to adapt to requirements of the IMT-Advanced technology of the ITU. In this respect, it has been discussed that the LTE-A should support a bandwidth more extended than that in the existing LTE system to satisfy the requirements of the ITU. In order to extend a bandwidth in the LTE-A system, a carrier of the existing LTE system will be defined as a component carrier (hereinafter, referred to as CC), and maximum five CCs may be grouped. For reference, a serving cell may include one downlink CC and one uplink CC. Alternatively, the serving cell may include one downlink CC. Since the CC may have a maximum bandwidth of 20 MHz in the same manner as the LTE system, the bandwidth may be extended to maximum 100 MHz. In this way, the technology that a plurality of CCs may be grouped will be referred to as CA.

If a CA scheme is used, only one RRC connection exists between the user equipment and the network. Among a plurality of serving cells configured to be used by the user equipment, a serving cell, which provides security input and mobility information of a NAS layer to establish and re-establish RRC connection, will be referred to as a primary serving cell (PCell) and the other cells will be referred to as secondary serving cells (SCell).

Figure 9:
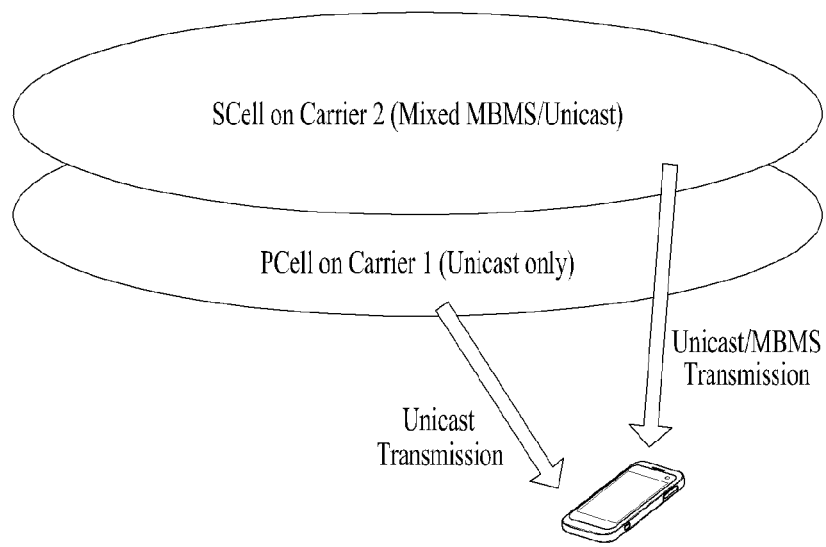
FIG. 9 is a diagram illustrating a status to which the second embodiment of the present invention is applied.

FIG. 9 is a diagram illustrating a status to which the second embodiment of the present invention is applied.

In the meantime, according to the related art, the user equipment UE may receive MBMS through the PCell, and the probability that the user equipment may receive MBMS through the SCell has been discussed. Accordingly, if the user equipment cannot receive MBMS through the SCell in FIG. 9, the user equipment may receive the MBMS only if a cell, which provides the MBMS, is set as the PCell in the user equipment. In other words, the user equipment cannot receive the MBMS in the state of FIG. 9. Moreover, a problem occurs in that the network cannot know whether the user equipment may receive the MBMS through the SCell.

Accordingly, according to the second embodiment of the present invention, in order to receive a specific MBMS broadcasted from a specific frequency/cell, the user equipment UE recognizes a plurality of cells and transmits an indicator to the base station after identifying whether to receive the specific service provided from the specific cell.

In more detail, according to the second embodiment of the present invention, in order to receive the MBMS even through any serving cell, the user equipment UE, which supports a carrier aggregation scheme, transmits an indicator, which indicates whether the MBMS may be received through the SCell, to the network, and sets the SCell, which provides the MBMS, as the PCell in accordance with indication of the network and then receives the MBMS. This will be described in more detail with reference to the accompanying drawing.

Figure 10:
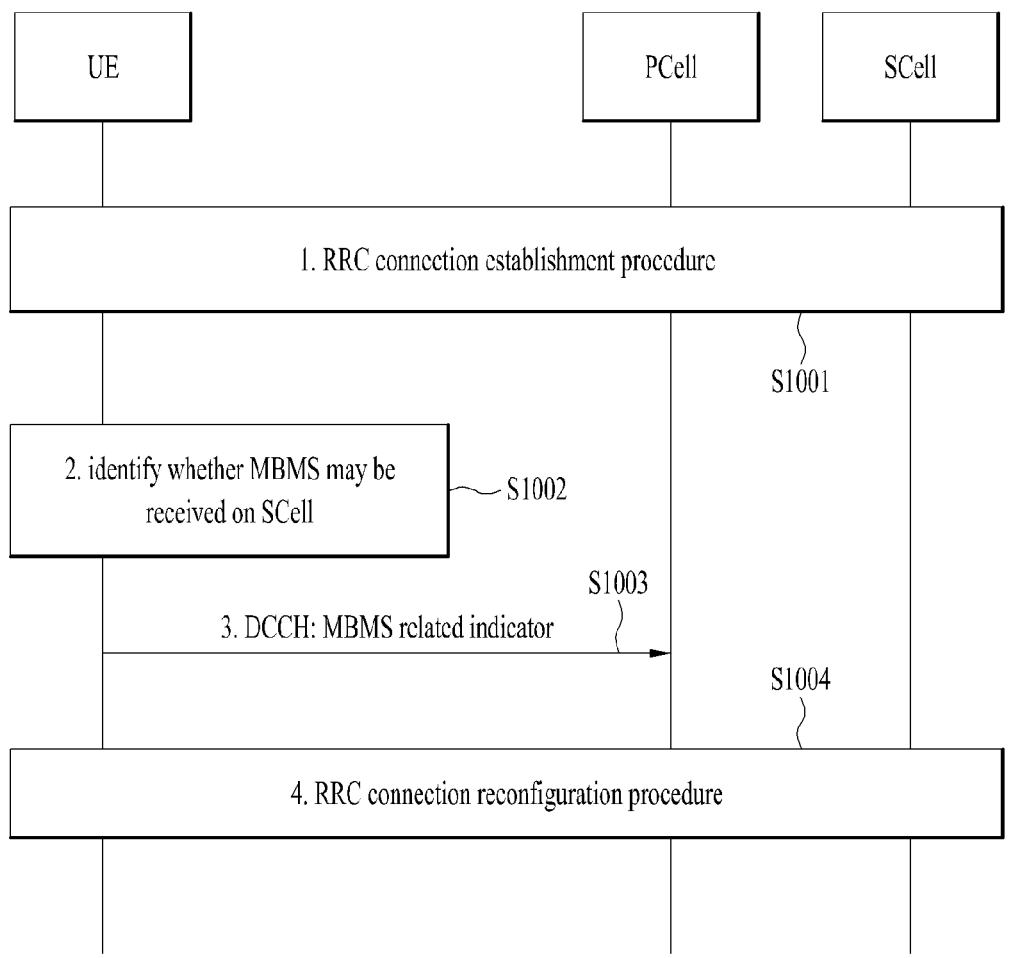
FIG. 10 is a flow chart illustrating an example of transmitting MBMS related indicator to a network in accordance with the second embodiment of the present invention.

FIG. 10 is a flow chart illustrating an example of transmitting MBMS related indicator to a network in accordance with the second embodiment of the present invention. In particular, it is assumed that the user equipment UE supports a carrier aggregation scheme and is in RRC connected mode. It is also assumed that one PCell and one or more SCells are set for the user equipment UE and MBMS cannot be received through one of the SCells.

Referring to FIG. 10, the user equipment UE performs RRC connection establishment procedure with the network at step 1001. If the user equipment desires to receive the MBMS during or after the RRC connection establishment procedure, the user equipment identifies whether the MBMS may be received on the SCell at step 1022, and transmits MBMS related indicator, which includes information as to whether the MBMS may be received on the SCell, to the network at step 1003. In this case, the MBMS related indicator may be transmitted onto the DCCH.

Also, the user equipment UE may transmit the MBMS related indicator, which includes information as to whether the MBMS may be received, to the network during the RRC connected mode with the network not the RRC connection establishment procedure.

Also, the network may request the user equipment of information as to whether the MBMS may be received, on the SCell, during the RRC connected mode, and the user equipment may transmit the MBMS related indicator, which includes information as to whether the MBMS may be received, to the network in response to the request.

Subsequently, the network that has received the MBMS related indicator performs the RRC connection reconfiguration procedure at step 1004 by transmitting RRC connection reconfiguration message for changing the SCell, which provides the MBMS, to the PCell, to the user equipment. In other words, in view of the user equipment, the SCell, which provides the MBMS, is changed to the PCell.

Figure 11:
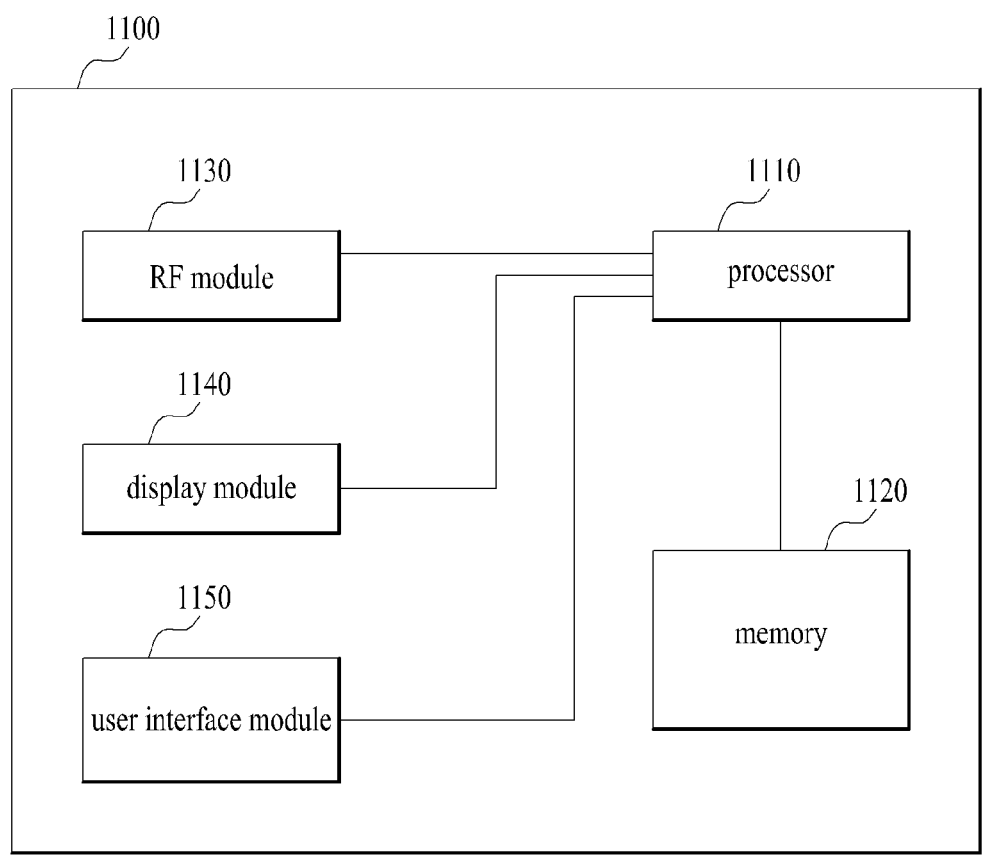
FIG. 11 is a block diagram illustrating a communication device according to the embodiment of the present invention.

FIG. 11 is a block diagram illustrating a communication device according to the embodiment of the present invention.

Referring to FIG. 11, the communication device 1100 includes a processor 1110, a memory 1120, a radio frequency (RF) module 1130, a display module 1140, and a user interface module 1150.

The communication device 1100 is illustrated for convenience of description, and some of its modules may be omitted. Also, the communication device 1100 may further include necessary modules. Moreover, some modules of the communication device 1100 may be divided into segmented modules. The processor 1110 is configured to perform the operation according to the embodiment of the present invention illustrated with reference to the drawings. In more detail, the detailed operation of the processor 1110 will be understood by the disclosure described with reference to FIG. 1 to FIG. 10.

The memory 1120 is connected with the processor 1110 and stores an operating system, an application, a program code, and data therein. The RF module 1130 is connected with the processor 1110 and converts a baseband signal to a radio signal or vice versa. To this end, the RF module 1130 performs analog conversion, amplification, filtering and frequency uplink conversion, or their reverse processes. The display module 1140 is connected with the processor 1110 and displays various kinds of information. Examples of the display module 1140 include, but not limited to, a liquid crystal display (LCD), a light emitting diode (LED), and an organic light emitting diode (OLED). The user interface module 1150 is connected with the processor 1110, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiment according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the method for enabling a user equipment to transmit and receive a signal in a wireless communication system and the device for the same have been described based on the 3GPP LTE system, they may be applied to various wireless communication systems in addition to the 3GPP LTE system.

The invention claimed is:

1. A method for reselecting a cell at a user equipment in a wireless communication system, the method comprising:
    receiving first cell reselection priority information from a network;
    generating second cell reselection priority information based on the first cell reselection priority information;
    receiving probability information related to cell reselection from the network; and
    performing a first cell reselection according to the second cell reselection priority information and the received probability information when a specific service is received or is desired to be received and when a first random number generated by the user equipment is lower than a number indicated by the probability information,
    wherein generating the second cell reselection priority information comprises modifying a priority of a frequency on which the specific service is provided as a highest priority, and
    wherein, when a cell selected by the first cell reselection is a secondary cell of the user equipment, the method further comprises:
    transmitting, to the network, a first message indicating that the user equipment cannot receive the specific service via the secondary cell;
    receiving a second message for changing the secondary cell to a primary cell of the user equipment; and
    receiving the specific service via the changed primary cell from the network.

2. The method according to claim 1, further comprising:
    performing a second cell reselection in accordance with the first cell reselection priority information.

3. The method according to claim 1, further comprising:
    When a cell having the frequency on which the specific service is provided is reselected, receiving the specific service from the reselected cell.

4. The method according to claim 1, further comprising:
    generating a second random number if the user equipment does not receive the specific service or does not wish to receive the specific service; and
    determining whether to apply the first cell reselection priority during a second cell reselection by comparing the received probability information with the second random number.

5. The method according to claim 1, further comprising:
    generating a second random number if the user equipment performs connection configuration with the network; and
    determining whether to apply the first cell reselection priority during a second cell reselection by comparing the received probability information with the second random number.

* * * * *